(12) United States Patent
Oohira

(10) Patent No.: US 8,581,862 B2
(45) Date of Patent: Nov. 12, 2013

(54) LIQUID CRYSTAL DISPLAY DEVICE

(75) Inventor: Eiji Oohira, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 798 days.

(21) Appl. No.: 12/763,450

(22) Filed: Apr. 20, 2010

(65) Prior Publication Data

US 2010/0271329 A1    Oct. 28, 2010

(30) Foreign Application Priority Data

Apr. 27, 2009    (JP) ................................. 2009-107678

(51) Int. Cl.
  *G09G 5/00*    (2006.01)
(52) U.S. Cl.
  USPC ......................................................... 345/173
(58) Field of Classification Search
  USPC ............ 345/102, 104, 173; 178/18.03–18.07;
      715/863, 864; 313/498; 362/97.1–97.3;
      349/69, 70
  See application file for complete search history.

(56) References Cited

U.S. PATENT DOCUMENTS

| | | | |
|---|---|---|---|
| 6,358,767 B2 * | 3/2002 | Eguchi | 438/30 |
| 6,462,941 B1 * | 10/2002 | Hulick et al. | 361/679.24 |
| 6,549,195 B2 * | 4/2003 | Hikida et al. | 345/173 |
| 2003/0095111 A1 * | 5/2003 | Song et al. | 345/173 |
| 2004/0196267 A1 * | 10/2004 | Kawai et al. | 345/173 |
| 2005/0099402 A1 * | 5/2005 | Nakanishi et al. | 345/173 |

FOREIGN PATENT DOCUMENTS

| | | |
|---|---|---|
| JP | 2008-083491 | 4/2008 |
| JP | 2008-083491 A | 4/2008 |
| KR | 10-0445291 | 8/2004 |
| WO | WO 2005/059635 A1 | 6/2005 |

* cited by examiner

*Primary Examiner* — Tom Sheng
(74) *Attorney, Agent, or Firm* — Antonelli, Terry, Stout & Kraus, LLP.

(57) ABSTRACT

In a liquid crystal display device in which a front window and a touch panel are bonded together with an adhesive sheet, a logo having plural layers is formed on a back side of the front window. A touch-panel flexible wiring substrate is mounted to the touch panel. A plane distance between an end portion of the plural layers of the logo and an end portion of the touch panel is set to greater than zero. With this configuration, it is possible to prevent a peeling stress on the adhesive sheet, even if a thickness of the adhesive sheet is smaller than the sum of a thickness of the touch-panel flexible wiring substrate and a thickness of the logo.

5 Claims, 8 Drawing Sheets

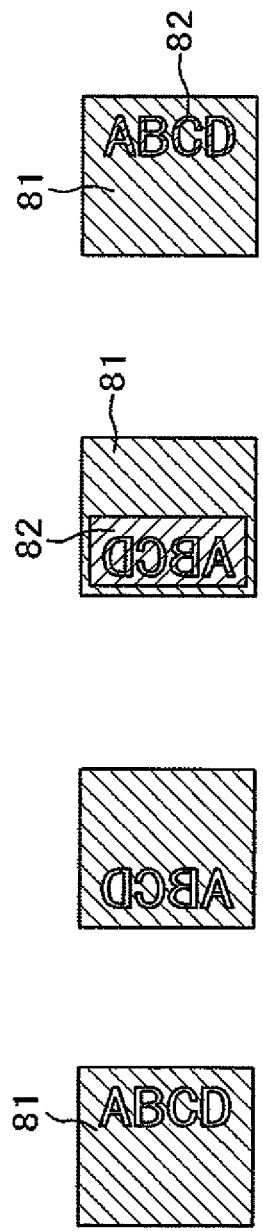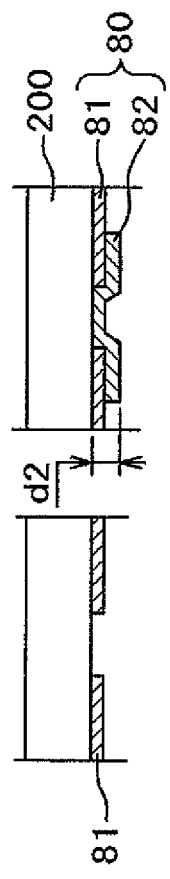

LIQUID CRYSTAL DISPLAY DEVICE

CLAIM OF PRIORITY

The present application claims priority from Japanese Patent Application JP 2009-107678 filed on Apr. 27, 2009, the content of which is hereby incorporated by reference into this application.

FIELD OF THE INVENTION

The present invention relates to a liquid crystal display device, and more particularly to a small display device having a touch panel and a front window provided in the interfacial surface of the display device for electronic devices such as mobile phones.

BACKGROUND OF THE INVENTION

In the liquid crystal display device, a TFT substrate has pixel electrodes and thin film transistors (TFTs), and the like, arranged at a matrix form. A color filter substrate has a color filters arranged at positions corresponding to the pixel electrodes of the TFT substrate. The TFT substrate and the color filter substrate are opposite to each other with a liquid crystal interposed therebetween. In such a configuration, the liquid crystal display device forms an image by controlling the transmittance of light of the liquid crystal molecules for each pixel.

Liquid crystal display devices can be made small and thin, and are used in a wide range of applications in mobile phones or other electronic devices. Recently a wide variety of applications have been implemented in mobile phones. There is also a demand for input devices to have a function allowing finger input through a touch panel, in addition to the conventional key-button operation. In this case, the touch panel is mounted on the side of the color filter substrate of the liquid crystal display panel.

Meanwhile, in the liquid crystal display device, there is a strong demand for reducing the thickness of the liquid crystal display panel, in addition to reducing the overall size of the set, while keeping a certain size of the screen. The thickness of the liquid crystal display panel is reduced by polishing the outside of the liquid crystal display panel after production of the liquid crystal display panel. A liquid crystal display panel includes two glass substrates. One is a TFT substrate in which pixel electrodes, thin film transistors (TFTs), and the like, are formed. The other is a color filter substrate in which color filters are formed. The TFT substrate and the color filter substrate are standardized, for example, to 0.5 mm or 0.7 mm. It is difficult to obtain such standardized glass substrates from a market. In addition, very thin glass substrates have a problem relating to mechanical strength and bending in the production process, leading to a reduction in the production yield. As a result, the liquid crystal display panel is formed by the standardized glass substrates, and then the outside of the liquid crystal display panel is polished to reduce the thickness of the liquid crystal display panel.

The reduction of the thickness of the liquid crystal display panel poses a problem of the mechanical strength. When a mechanical pressure is applied to the display surface of the liquid crystal display panel, there is a risk that the liquid crystal display panel will be broken. This is the same for the touch panel set to the liquid crystal display panel due to a small thickness of the touch panel.

In order to prevent the liquid crystal display panel from being broken by outside force, a front window of resin or glass is attached to the screen side of the liquid crystal display panel. In this case, an air layer exists between the liquid crystal display panel and the touch panel, or between the touch panel and the front window. The transmittance of the light from the backlight is reduced by the reflection from the interface in this area.

In order to prevent this, JP-A No. 83491/2008 describes a configuration in which an adhesive layer or an anti-reflection coating is formed between the liquid crystal display panel and the touch panel, or between the touch panel and the front window.

A liquid crystal display device having a liquid display panel, a touch panel, and a front window, is often labeled with a logo representing the abbreviation of the phone function or the telephone service company. Such a logo is formed by printing on the back side of the touch panel.

The logo is displayed in white or a predetermined color. The display is formed by applying a predetermined color or white to a cut-out shape of a predetermined logo printed in black. As a result, the thickness of the recoated portion of the logo is increased to about 20 μm.

The front window and the touch panel are bonded together with an adhesive sheet. If a thick printed mark is formed between the adhesive sheet and the front window, this will have an adverse effect on the adhesive force between the touch panel and the adhesive sheet. Thus, the recoated portion of the logo should be formed on the outside of the adhesive sheet.

A touch-panel flexible wiring substrate is connected to the touch panel in order to supply electric current and signals to the touch panel. For this reason, the adhesive sheet may not be provided in the vicinity of the area in which the touch-panel flexible wiring substrate is mounted.

However, when the recoated logo is formed as described above and is provided on the outside of the adhesive sheet, the touch panel, the touch-panel flexible wiring substrate, and the logo may overlap with each other. The overlapping of the three components may cause a stress peeling apart the front window and the touch panel. Such a stress has an adverse effect on the reliability of the liquid crystal display panel.

SUMMARY OF THE INVENTION

One object of the present invention is to provide a liquid crystal display device having a liquid crystal display panel, a touch panel, a front window, and a logo formed on the front window, with a configuration that ensures the reliability of the adhesive force between the front window and the touch panel.

The present invention overcomes the problems identified above. Specific configurations are as follows.

(1) A liquid crystal display device includes a liquid crystal display panel with a backlight housed in a resin mold, a touch panel attached to the liquid crystal display panel, and a front window attached to the touch panel. The touch panel and the front window are bonded together with an adhesive sheet. A touch-panel flexible wiring substrate is connected to a specific side of the touch panel. A logo having plural layers is formed on a surface of the front window on the side of the touch panel. A portion of the logo corresponding to the plural layers is provided on the outside of the adhesive sheet. A plane distance between an end portion of the plural layers of the logo and an end portion of the touch panel is greater than zero.

(2) In the liquid crystal display device described in (1), when a thickness of the adhesive sheet is d1, a thickness of the portion of the logo corresponding to the plural layers is d2, and a thickness of the touch-panel flexible wiring substrate is d3, the relationship d1<d2+d3 is established.

(3) In the liquid crystal display device described in (1), the plane distance between an end portion of the plural layers of the logo and an end portion of the touch panel is greater than 0.3 mm.

(4) A liquid crystal display device includes a liquid crystal display panel with a backlight housed in a resin mold, a touch panel attached to the liquid crystal display panel, and a front window attached to the touch panel. The touch panel and the front window are bonded together with an adhesive sheet. A touch-panel flexible wiring substrate is connected to a specific side of the touch panel. A logo is formed on a surface of the front window on the side of the touch panel. The logo is formed by two layers including a first layer and a second layer from the side of the front window. A portion of the logo corresponding to the two layers is provided on the outside of the adhesive sheet. A plane distance between an end portion of the second layer of the logo and an end portion of the touch panel is greater than zero.

(5) A liquid crystal display device includes a liquid crystal display panel with a backlight housed in a resin mold, a touch panel attached to the liquid crystal display panel, and a front window attached to the touch panel. The touch panel and the front window are bonded together with an adhesive sheet. A touch-panel flexible wiring substrate is connected to a specific side of the touch panel. A logo is formed on a surface of the front window on the side of the touch panel. The logo is formed by three layers including a first layer, a second layer, and a third layer from the side of the front window. An end portion of the second layer is covered by the third layer. A portion of the three layers of the logo is provided on the outside of the adhesive sheet. A plane distance between an end portion of the second layer of the logo and an end portion of the touch panel is greater than zero.

According to the present invention, no peeling stress is applied to the adhesive sheet, even if the thickness of the adhesive sheet for bonding the front window and the touch panel is smaller than the thickness of the touch-panel flexible wiring substrate and the thickness of the logo formed on the front window. As a result, it is possible to provide a highly reliable liquid crystal display device.

Further, according to the present invention, the thickness of the adhesive sheet for bonding the front window and the touch panel can be made smaller than the thickness of the touch-panel flexible wiring substrate and the thickness of the logo formed on the front window. As a result, it is possible to reduce the thickness of the liquid crystal display device.

BRIEF DESCRIPTION OF THE DRAWINGS

FIGS. 6A to 6F are views of the process of forming a logo;

DETAILED DESCRIPTION OF THE PREFERRED EMBODIMENTS

Hereinafter, the present invention will be described in detail through embodiments.

First Embodiment

Figure 1:
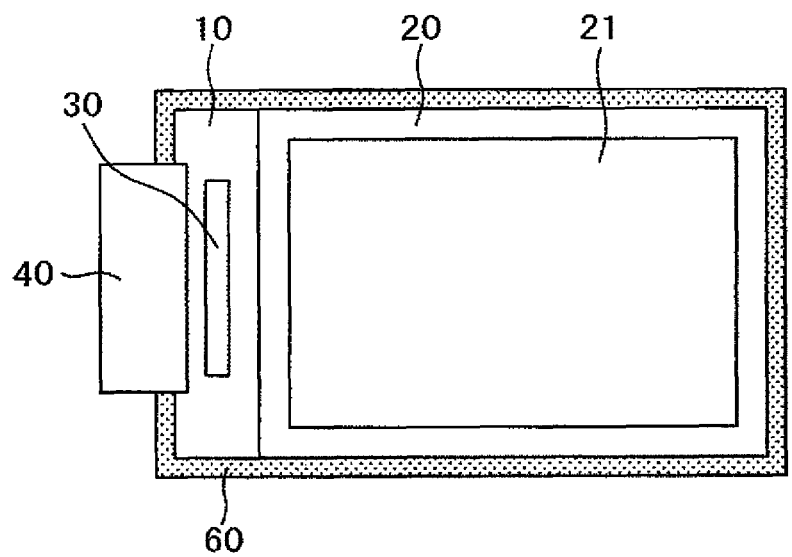
FIG. 1 is a top view of a liquid crystal display device according to a first embodiment.

FIG. 1 is a top view of a liquid crystal display device used for mobile phones or other electronic devices, according to the present invention. In FIG. 1, a color filter substrate 20 is mounted to a TFT substrate 10. A liquid crystal layer, not shown, is interposed between the TFT substrate 10 and the color filter substrate 20. The TFT substrate 10 and the color filter substrate 20 are bonded together with a sealing material, not shown, which is formed in the frame portion of the liquid crystal display panel. The TFT substrate 10 is made to be larger than the color filter substrate 20. A terminal portion is formed in the portion of the TFT substrate 10 extending beyond the color filter substrate 20, in order to supply power, image signals, scan signals, and the like.

An IC driver 30 is connected to the terminal portion to drive scan lines, image lines, and the like. The IC driver 30 includes a scan line drive circuit and an image signal line drive circuit. The IC driver 30 is supplied with scan signals and image signals through a main flexible wiring substrate 40 connected to the terminal portion.

An upper polarization plate 21 is attached to the upper side of the TFT substrate 10. The overall size of the upper polarization plate 21 is substantially equal to the display area. In other words, the liquid crystal can only control polarized light, so that a lower polarization plate is attached to the lower side of the TFT substrate 10 in order to polarize the light from the backlight into linearly polarized light. The linearly polarized light is modulated by the liquid crystal layer. The transmittance is changed for each pixel, and thus an image is formed. Then, the image is visible to human eyes when the light is polarized (analyzed) by the upper polarization plate 21.

The whole liquid crystal display panel is housed in a frame-like resin mold 60. The backlight described below is also housed on the lower side of the liquid crystal display panel in the resin mold 60. In FIG. 1, the main flexible wiring substrate 40, which is connected to the terminal portion of the liquid crystal display panel, is folded over the back surface in an end portion of the resin mold 60. In this way, the overall size of the liquid crystal display device is reduced.

Figure 2:
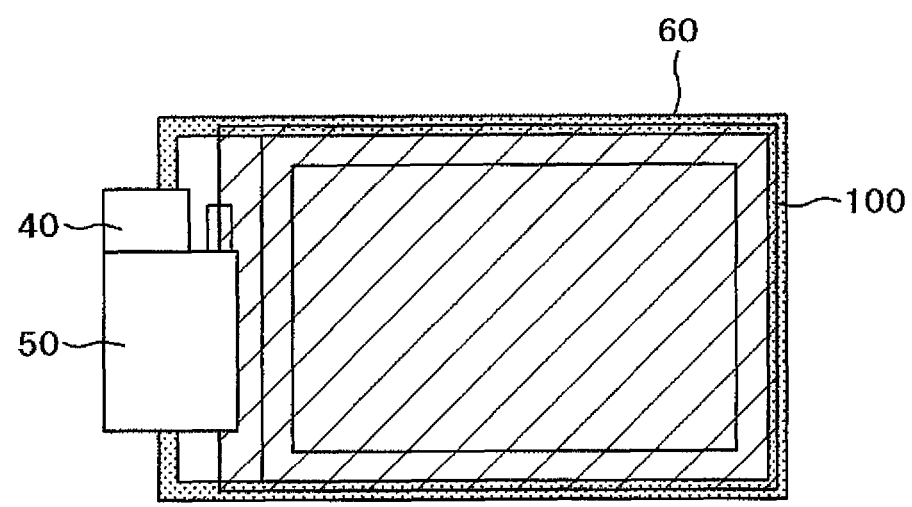
FIG. 2 is a top view of the liquid crystal display device in which a touch panel is mounted.

FIG. 2 is a view in which a touch panel 100 is bonded to the liquid crystal display panel explained with FIG. 1. The touch panel 100 is made to be slightly larger than the color filter substrate 20 of the liquid crystal display panel, covering also a part of the resin mold 60. In FIG. 2, a touch-panel flexible wiring substrate 50 is mounted to an end portion of the touch panel 100 in order to supply power and signals to the touch panel 100. The touch-panel flexible wiring substrate 50 is also folded over the back surface in the end portion of the resin mold 60, to reduce the overall size of the liquid crystal display device. It should be noted that the main flexible wiring substrate 40 and the touch-panel flexible wiring substrate 50 are connected to each other on the back surface of the resin mold 60.

In general, the substrate of the touch panel is formed by a glass. However, a plastic substrate may also be used if it is transparent and can sustain anneal temperatures for ITO, and the like. Examples of the transparent resin include acryl and polycarbonate.

The substrate of the touch panel 100 is attached to the color filter substrate 20 of the liquid crystal display panel with an adhesive material. In this embodiment, for example, an acrylic-based UV curable resin 110 is used as the adhesive material. The UV curable resin 110 initially is a liquid. The liquid crystal display panel and the touch panel 100 are bonded together in a reduced-pressure atmosphere, preventing air bubbles from entering.

The cured UV curable resin 110 is thermoplastic. In other words, this is because when defects such as air bubbles and foreign materials are found between the touch panel 100 and the liquid crystal display panel after the completion of the bonding process, the touch panel 100 is detached from the liquid crystal display panel for reproduction. It should be noted that an adhesive sheet can also be used to bond the color filter substrate 20 and the touch panel 100 together. In this case, the adhesive sheet is preferably also thermoplastic.

Figure 3:
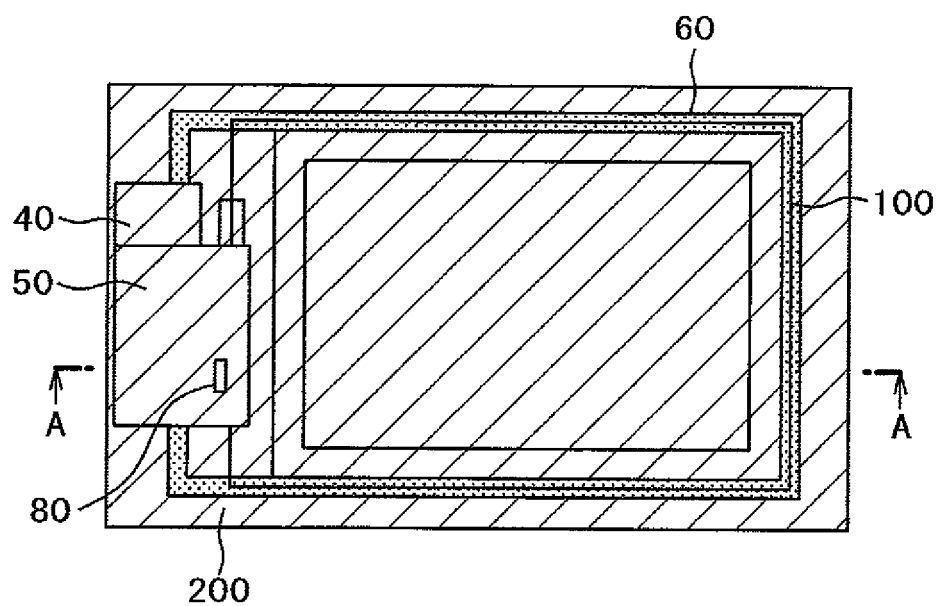
FIG. 3 is a view of the liquid crystal display device in which a front window is mounted.

FIG. 3 shows a state in which a front window 200 is mounted to the liquid crystal display panel in which the touch panel 100 is mounted as shown in FIG. 2. In general, the front window 200 is formed by a glass with a thickness of about 0.5 mm. Plastic such as acrylic resin and polycarbonate resin can also be used as the material of the front window 200.

When the front window 200 is mounted, the adhesive sheet 210 is provided between the touch panel 100 and the front window 200. In this case, the adhesive sheet 210 is formed on the side of the front window 200 to make the operation easier. Further, the adhesive sheet 210 used here is also thermoplastic by taking into account the possibility of reproducing the touch panel 100, as in the case of the UV curable resin 110 formed between the liquid crystal display panel and the touch panel 100.

In FIG. 3, the overall size of the front window 200 is larger than the liquid crystal display panel and the resin mold 60, covering the entire liquid crystal display panel and the other components. Further, the front window 200 also covers the main flexible wiring substrate 40 mounted to the TFT substrate 10, as well as the touch-panel flexible wiring substrate 50 mounted to the touch panel 100.

In FIG. 3, a logo 80 is provided on the back side of the front window 200 in a peripheral portion thereof. The logo 80 is provided in a position overlapping the touch-panel flexible wiring substrate 50.

Figure 4:
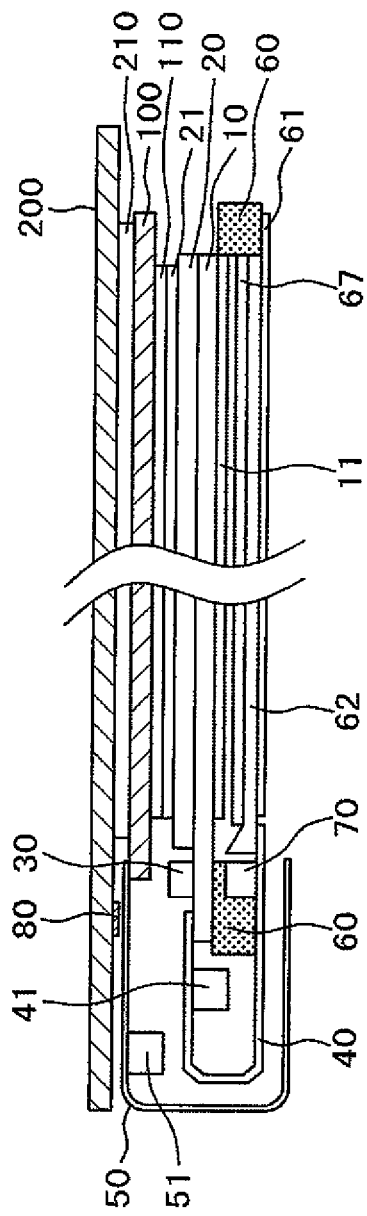
FIG. 4 is a cross-sectional view of FIG. 3.

FIG. 4 is a cross-sectional view taken along line A-A of FIG. 3. In the present specification, the combination of the TFT substrate 10 and the color filter substrate 20 is referred to as the liquid crystal cell. Further, a lower polarization plate 11 and an upper polarization plate 21 are bonded to the liquid crystal cell, which is referred to as the liquid crystal display panel. The touch panel 100 is bonded to the upper polarization plate 21 bonded to the color filter substrate 20 by means of the UV curable resin 110.

On the touch panel 100, the front window 200 is bonded with the adhesive sheet 210. There may be a case in which the front window 200 is formed of plastic such as polycarbonate or acryl. The overall size of the front window 200 is large, covering the touch-panel flexible wiring substrate 50 as well as the main flexible wiring substrate 40.

The touch-panel flexible wiring substrate 50 is connected to the touch panel 100. The touch-panel flexible wiring substrate 50 is provided with an electronic component 51 for the touch panel 100. The electronic component 51 for the touch panel 100 is provided on the lower side of the flexible wiring substrate 50.

In FIG. 4, the IC driver 30 is provided in the terminal portion of the TFT substrate 10 of the liquid crystal cell. Further, the main flexible wiring substrate 40 is connected to a terminal formed in the TFT substrate 10. The main flexible wiring substrate 40 is folded over the back surface of the liquid crystal display panel.

An LCD electronic component 41 is mounted to the main flexible wiring substrate 40. In FIG. 4, the front window 200 is designed to also cover the LCD electronic component 41 mounted to the main flexible wiring substrate 40. It should be noted that the electronic component is not necessarily mounted downward as shown in FIG. 4. The electronic component may be provided upward in the portion of the flexible wiring substrate extending along the back surface of the backlight, depending on the layout.

In FIG. 4, the electronic component is provided on the lower side of the main flexible wiring substrate 40. At the same time, a light emitting diode 70 is also provided on the lower side of the main flexible wiring substrate 40 along with the other electronic component. However, the light emitting diode 70 is provided in a portion of the main flexible wiring substrate 40 folded over the back surface of the resin mold 60. In this way, the light emitting diode 70 can be housed in a concave portion formed in the resin mold 60, when the main flexible wiring substrate 40 is folded over the back surface of the resin mold 60. Then, as shown in FIG. 4, the light emitting diode 70 is disposed opposite to an end of a light guide panel 62, which forms a part of the backlight. In this embodiment, a white light emitting diode is used as the light emitting diode 70.

In FIG. 4, the liquid crystal display panel is placed on the resin mold 60. The resin mold 60 is shaped like a rectangular frame. In FIG. 4, the lower polarization plate 11 of the liquid crystal display panel is housed in the resin mold 60, and the backlight is provided on the back surface of the lower polarization plate 11. The backlight has the following configuration.

The light guide panel 62 is disposed at one end opposite to the light emitting diode 70. The role of the light guide panel 62 is to direct the light from the light emitting diode 70 entering from the side surface, towards the liquid crystal display panel. The size of the light emitting diode 70 is large. For this reason, the thickness of the whole liquid crystal display device is reduced by increasing the height of the light guide panel 62 at the portion opposite to the light emitting diode 70, and by reducing the thickness at the portion overlapping optical sheets described below.

In FIG. 4, a reflective sheet 61 is provided on the lower side of the light guide panel 62. This is in order to reflect and direct the light, which travels from the light guide panel 62 downward, towards the liquid crystal display panel. Then, as shown in FIG. 5, optical sheets 67 including a lower diffusion sheet 63, a lower prism sheet 64, an upper prism sheet 65, and an upper diffusion sheet 66, are provided on the upper side of the light guide panel 62.

Figure 5:
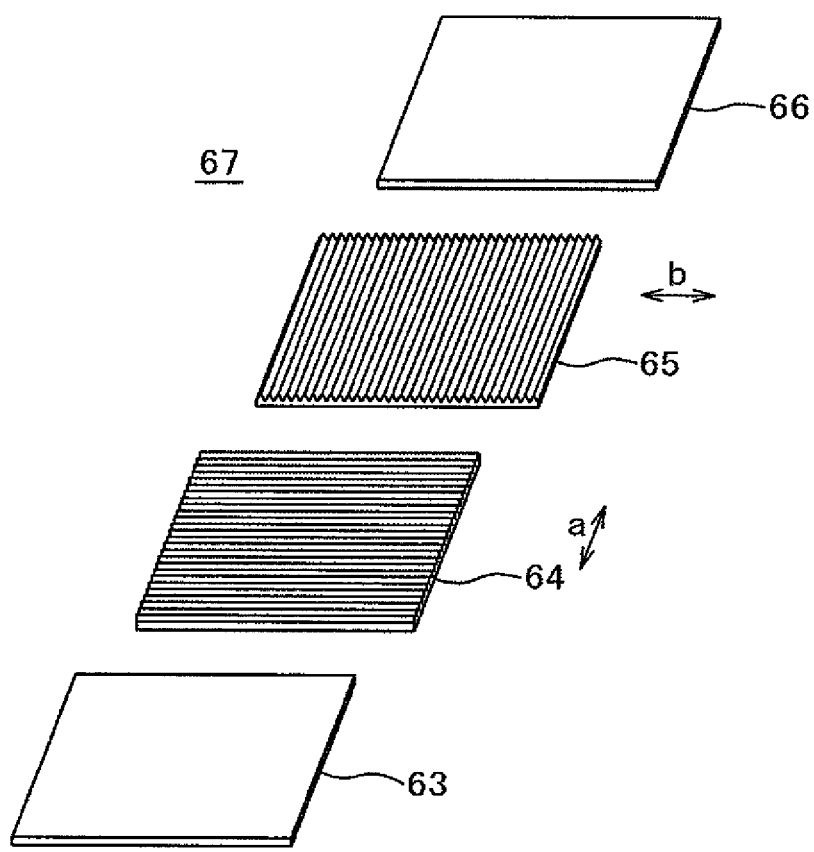
FIG. 5 is an exploded perspective view of optical sheets.

FIG. 5 is an exploded perspective view of the optical sheets 67. In FIG. 5, the lower diffusion sheet 63 has a role to reduce the variation in brightness. The lower prism sheet 64 has a role to direct the light spread in the a direction from the backlight, towards the liquid crystal display panel. The upper prism sheet 65 has a role to direct the light spread in the b direction from the backlight, towards the liquid crystal display panel. The upper diffusion sheet 66 has a major role to reduce the occurrence of moiré between the lower prism sheet 64 or the upper prism sheet 65, and the liquid crystal display panel.

Returning to FIG. 4, the optical sheets 67 are laminated on the light guide panel 62. A distance of about 50 μm is provided between the upper diffusion sheet 66 on the top of the optical sheets 67, and the lower polarization plate 11 of the liquid crystal display panel. This is to prevent scratches caused by friction between the lower polarization plate 11 and the upper diffusion sheet 66.

In FIG. 4, the main flexible wiring substrate 40 connected to the liquid crystal cell, and the touch-panel flexible wiring substrate 50 connected to the touch panel 100 are both folded over the back surface of the liquid crystal display panel. The main flexible wiring substrate 40 and the touch-panel flexible wiring substrate 50 are connected to each other in a portion not shown in FIG. 4.

In FIG. 4, the logo 80 is formed by printing on the back side of the front window 200 in which the adhesive sheet 210 does not exist. The logo 80 is provided in a position overlapping the touch-panel flexible wiring substrate 50. The logo 80 is formed by plural layers. FIG. 4 shows a cross section of the plural layers of the logo 80.

FIGS. 6A to 6F are views showing the method for forming the logo 80. The logo 80 is formed by printing. In FIGS. 6A to 6F, the logo 80 is formed of two layers. A first layer 81 is a black resin, in which a desired mark to be displayed is formed by printing. In FIGS. 6A to 6F, the cut out of A, B, C, D is printed on the first layer 81. FIG. 6A is a view seen from the front side of the front window 200. FIG. 6B is a view seen from the back side of the front window 200. The printing pattern is as shown in FIG. 6B. FIG. 6E is a cross-sectional view showing the state in which the first layer 81 of the logo 80 is printed.

The logo 80 is displayed in white or a predetermined color. This is by applying a second layer 82 to the first layer 81. FIG. 6C is a view of the state in which the second layer 82 is applied to the first layer 81, as seen from the back side of the front window 200. As shown in FIG. 6C, the second layer 82 is applied to a portion of the first layer 81.

FIG. 6F is a cross-sectional view of FIG. 6C. In FIG. 6F, the second layer 82 covers a window portion of the first layer 81. The color of the logo 80 is determined by the second layer 82. The second layer 82 is formed by a resin with a pigment of a predetermined color dispersed therein. FIG. 6D is a view of the logo 80 formed as described above, as seen from the front side of the front window 200.

The logo 80 is supposed to be visually recognized by reflecting light from outside. However, as shown in FIG. 4, the small liquid crystal display device for electronic devices such as mobile phones uses a light emitting diode as a light source. The light emitting diode should emit light with high brightness. The light from the light emitting diode leaks from the resin mold 60 or the optical components, and some of the light reaches the lower part of the logo 80. When the light from the light emitting diode has an effect on the logo 80, a predetermined visibility of the logo 80 may not be obtained.

In order to eliminate the effect of the light from the light emitting diode on the visibility of the color or other optical characteristics of the logo 80, it is necessary to block the light from the light emitting diode in the portion of the logo 80, or to increase the thickness of the second layer 82 of the logo 80. In this embodiment, the thickness of the second layer 82 is increased to remove the effect of the light from the light emitting diode.

In FIG. 6F, the thickness of the first layer 81 of the logo 80 is about 10 μm, and the thickness of the second layer 82 is about 15 μm or more. Thus, the thickness d2 of the second layer 82 of the logo 80 is 25 μm or more. Reducing the thickness of the liquid crystal display device is a requirement for the use of mobile phones and other electronic devices. For this reason, increasing the thickness of the logo 80 may be a problem.

Figure 7:
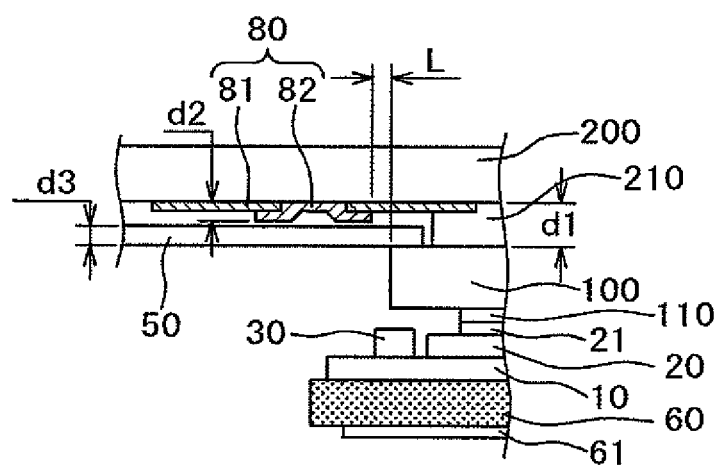
FIG. 7 is a detailed cross-sectional view around the logo.

FIG. 7 is a detailed cross-sectional view around the logo 80 of the liquid crystal display device shown in FIG. 4. In FIG. 7, the thickness d1 of the adhesive sheet 210 is, for example, 100 μm. The thickness d2 of the second layer of the logo 80 is, for example, 25 μm. The thickness of the touch-panel flexible wiring substrate 50 is about 70 μm. In FIG. 7, the d1 of the adhesive sheet 210 is slightly greater than the sum of the thickness d2 of the logo 80 and the thickness d3 of the touch-panel flexible wiring substrate 50.

However, taking into account the variation in the thickness of the components, it is possible that d1 may be smaller than the sum of d2 and d3, namely, d1<d2+d3. In addition, the reduction in thickness is the typical requirement for the liquid crystal display device, so that a further reduction in the thickness of the adhesive sheet 210 may also be expected. In this case, d1<d2+d3 may be normalized.

When the logo 80 is provided in the overlapping portion of the front window 200, the touch-panel flexible wiring substrate 50, and the touch panel 100 in the case in which d1<d2+d3 is established, a peeling stress is applied to the front window 200 and the touch panel 100 that are bonded together with the adhesive sheet 210. In FIG. 7, the first layer 81 of the logo 80 extends below the adhesive sheet 210. The adhesive sheet 210 is flattened and the thickness of the adhesive sheet 210 is reduced in this portion. Thus, in the comparison of the thicknesses of the components, the thickness d1 of the adhesive sheet 210 is compared to the other thicknesses.

According to the present invention, the logo 80 is provided in the position overlapping the touch-panel flexible wiring substrate 50 but not overlapping the touch panel 100. This makes it possible to prevent a peeling stress on the front window 200 and the touch panel 100. In other words, in FIG. 7, the distance L between an end portion of the second layer 82 of the logo 80, and an end portion of the touch panel 100 is set to be greater than zero.

With this configuration, even if the sum of the thickness of the logo 80, and the thickness of the touch-panel flexible wiring substrate 50 is greater than the thickness of the adhesive sheet 210, the touch-panel flexible wiring substrate 50 can move down, so that no peeling stress is applied to the adhesive sheet 210. As a result, it is possible to achieve a highly reliable liquid crystal display device.

Second Embodiment

When the light from the light emitting diode of the backlight is input to the logo 80 formed on the back side of the front window 200, a predetermined design quality may not be obtained in terms of the color or other optical characteristics of the logo 80. In order to prevent this, in the first embodiment, the thickness of the second layer 82 of the logo 80 is increased. However, the light shielding effect may not be sufficiently obtained in the first embodiment. In a second embodiment, a third layer 83, which is a light shielding film, is further formed on the second layer 82 for forming white or a predetermined color of the logo 80, in order to prevent the effect of the light from the light emitting diode.

Figure 8A:
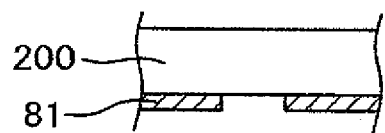
FIGS. 8A, 8B, and 8C are views of the process of forming the logo according to a second embodiment.
Figure 8B:
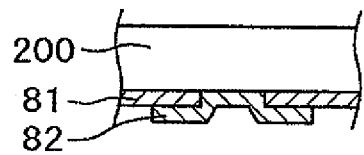
Figure 8C:
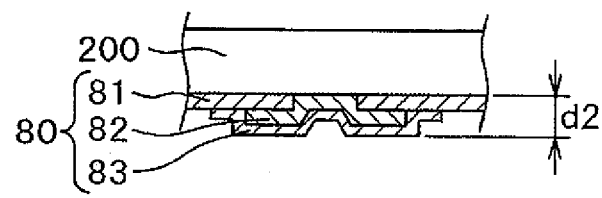

FIGS. 8A, 8B, and 8C are cross-sectional views of the process of forming the logo 80 according to the second embodiment. FIG. 8A is a view in which the first layer 81 is formed on the back surface of the front window 200. FIG. 8B is a view in which the second layer 82 is formed. FIG. 8C is a view in which the third layer 83 is formed. The thickness of the first layer 81 is about 10 µm, and the thickness of the second layer 82 is about 10 µm. Similarly, the thickness of the third layer 83 is about 10 µm.

In this embodiment, the thickness of the second layer 82 is smaller than the case of the first embodiment by the thickness of the third layer 83 serving as a light shielding film formed on the second layer 82. The second layer 82 is formed by a resin in which a pigment of white color or a predetermined color is dispersed. The third layer 83, serving as a light shielding film, is black using an organic resin such as an epoxy resin in which the black pigment is dispersed.

In order to completely shield the light, the third layer 83 also covers a side portion of the second layer 82. In FIG. 8C, the total thickness d2 from the first layer 81 to the third layer 83 is, for example, about 30 µm. The thickness d2 of the logo 80 in FIG. 8C is important in the relationship between the thickness of the adhesive sheet 210 and the thickness of the touch-panel flexible wiring substrate 50.

Figure 9:
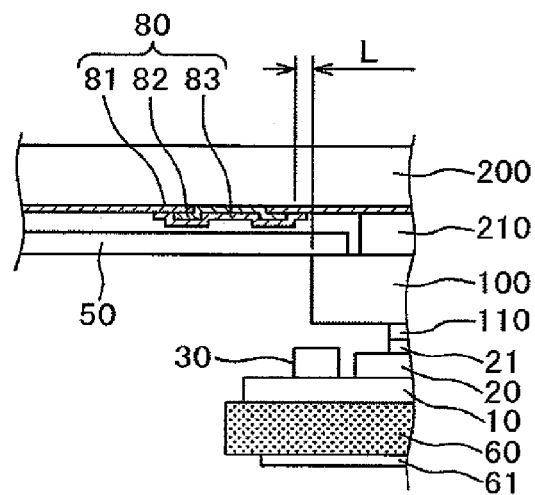
FIG. 9 is a detailed cross-sectional view around the logo according to the second embodiment.

FIG. 9 is a cross-sectional view in which the logo 80 of the three layers is formed on the back surface of the front window 200. In FIG. 9, the thickness d1 of the adhesive sheet 210 is 100 µm, the thickness d3 of the touch-panel flexible wiring substrate 50 is 70 µm, and the thickness d2 of the three layers of the logo 80 is 30 µm. Taking into account the manufacturing tolerance of the components, the half is represented by d1<d2+d3.

In FIG. 9, an end portion of the third layer 83 of the logo 80 is formed on the outside of the end of the touch panel 100. In other words, L is greater than zero in FIG. 9. Thus, the touch-panel flexible wiring substrate 50 can move down even if the relationship d1<d2+d3 is established. For this reason, no peeling stress is applied to the adhesive sheet 210 between the front window 200 and the touch panel 100.

In FIG. 9, L is the plane distance between the end portion of the second layer 82, and the end portion of the touch panel 100. In other words, L represents the distance between the end portion of the three layers of the logo 80 and the end portion of the touch panel 100.

As described above, in the configuration of the second embodiment, even if the logo 80 is formed of three layers, no peeling stress is applied to the front window 200 and the touch-panel flexible wiring substrate 50. As a result, it is possible to prevent the degradation of the reliability of the liquid crystal display device.

Third Embodiment

In the first embodiment, the distance L between the end portion of the second layer 82 of the logo 80 and the end portion of the touch panel 100 is set to be greater than zero. In the second embodiment, the distance L between the end portion of the three layers of the logo 80 and the end portion of the touch panel 100 is set to be greater than zero. In the vicinity of the distance L of zero, the bending stress is large. If the relationship d1<d2+d3 is established in FIG. 7 and other figures, there may be a peeling stress on the adhesive sheet 210 between the front window 200 and the touch-panel flexible wiring substrate 50.

Figure 10:
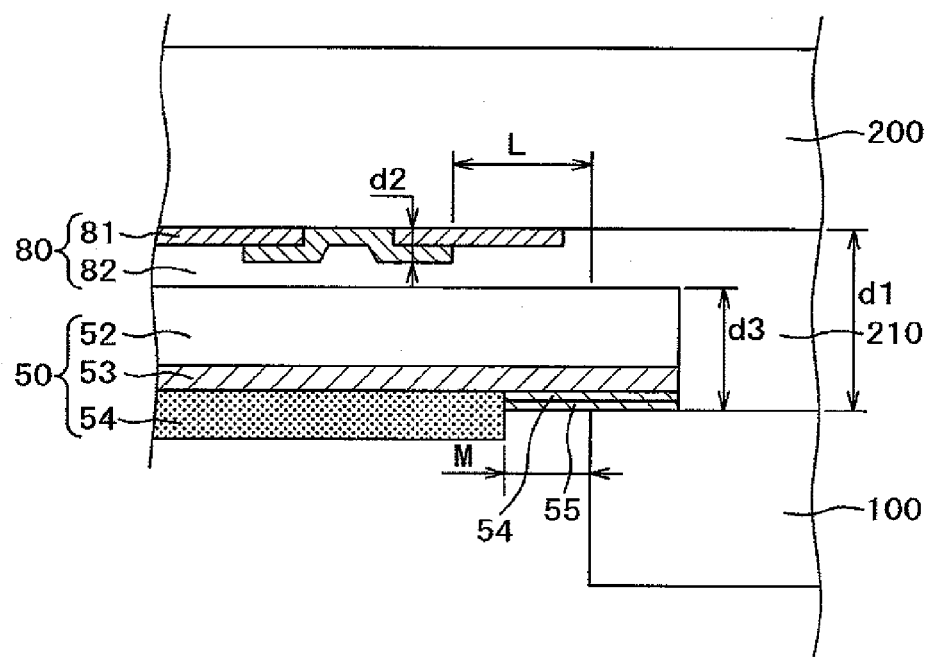
FIG. 10 is a detailed cross-sectional view around the logo according to a third embodiment.

A third embodiment deals with this problem. FIG. 10 is a detailed cross-sectional view around the logo 80 formed on the back surface of the front window 200 according to the third embodiment. In FIG. 10, the configuration below the touch panel 100 is omitted.

In FIG. 10, the touch-panel flexible wiring substrate 50 is mounted to the touch panel 100. The touch-panel flexible wiring substrate 50 is provided with a base material 52, a copper wiring 53 formed on the base material 52, and an overcoat 54 covering the copper wiring 53. The overcoat 54 does not exist in the connecting portion of the touch-panel flexible wiring substrate 50 to the touch panel 100, but in which an Ni layer 55 and an Au layer 56 are formed.

The thicknesses of the individual components in FIG. 10 are as follows. The thickness of the base material 52 of the touch-panel flexible wiring substrate 50 is 40 µm. The thickness of the copper wiring 53 is 20 µm. The thickness of the overcoat 54 is 25 µm. The thickness of the Ni layer 55 in a terminal portion is 1 to 5 µm, and the thickness of the Au layer 56 is 0.03 to 0.3 µm. The Ni layer 55 and the Au layer 56 do not exist in the portion in which the overcoat 54 is formed. In FIG. 10, d3 represents the thickness of the touch-panel flexible wiring substrate 50 in which the overcoat 54 does not exist. Here, the thickness d3 of the touch-panel flexible wiring substrate 50 is compared to the thickness d1 of the adhesive sheet 210, and to the thickness d2 of the logo 80.

In FIG. 10, the thickness of the logo 80 is the same as the case of the first embodiment. In other words, the thickness of the first layer 81 is 10 µm, and the thickness of the second layer 82 thereof is 15 µm. Further, the thickness d1 of the adhesive sheet 210 is 100 µm. However, these components often vary in thickness. In FIG. 10, by setting L to 0.3 mm or more, it is possible to suppress the peeling stress on the adhesive sheet 210 to a very small level even if the relationship d1<d2+d3 is established.

In FIG. 10, when the distance M between an end portion of the overcoat 54 of the touch-panel flexible wiring substrate 50 and an end portion of the touch panel 100 is extremely small, the bending stress on the touch-panel flexible wiring substrate 50 increases. In this embodiment, however, the distance L between the end portion of the second layer 82 of the logo 80 and the end portion of the touch panel 100 is set to 0.3 mm or more, suppressing the bending stress on the touch-panel flexible wiring substrate 50 to a small level. As a result, it is possible to prevent the peeling stress on the adhesive sheet 210 caused by the bending stress.

In FIG. 10, the description is given for the case in which the logo 80 has two layers. However, this is the same for the logo 80 formed by three layers as in the case of the second embodiment.

What is claimed is:

1. A liquid crystal display device comprising:
a liquid crystal display panel with a backlight housed in a resin mold;
a touch panel attached to the liquid crystal display panel; and
a front window attached to the touch panel,
wherein the touch panel and the front window are bonded together with an adhesive sheet,
wherein a touch-panel flexible wiring substrate is connected to a specific side of the touch panel,
wherein a logo having a plurality of layers is formed on a surface of the front window which inner surface faces the touch panel,
wherein a portion of the plurality of layers of the logo is provided on a first portion of the inner surface of the front window which is outside of a second portion of the inner surface of the front window which is covered by the adhesive sheet, and
wherein a plane distance between an end portion of at least one of the plurality of layers of the logo and an end portion of the touch panel is greater than zero so that said one of the plurality of layers does not overlap the touch panel in a plane view.

2. The liquid crystal display device according to claim 1, wherein when a thickness of the adhesive sheet is d1, a thickness of the portion of the plurality of layers of the logo is d2, and a thickness of the touch-panel flexible wiring substrate is d3, the relationship d1<d2+d3 is established.

3. The liquid crystal display device according to claim 1, wherein the plane distance between an end portion of the plurality of layers of the logo and an end portion of the touch panel is greater than 0.3 mm.

4. A liquid crystal display device comprising:
a liquid crystal display panel with a backlight housed in a resin mold;
a touch panel attached to the liquid crystal display panel; and
a front window attached to the touch panel,
wherein the touch panel and the front window are bonded together with an adhesive sheet,
wherein a touch-panel flexible wiring substrate is connected to a specific side of the touch panel,
wherein a logo is formed on an inner surface of the front window which inner surface faces the touch panel,
wherein the logo is formed by two layers including a first layer and a second layer from the side of the front window,
wherein a portion of the two layers of the logo is provided on a first portion of the inner surface of the front window which is outside of a second portion of the inner surface of the front window which is covered by the adhesive sheet, and
wherein a plane distance between an end portion of the second layer of the logo and an end portion of the touch panel is greater than zero so that the second layer does not overlap the touch panel in a plane view.

5. A liquid crystal display device comprising:
a liquid crystal display panel with a backlight housed in a resin mold;
a touch panel attached to the liquid crystal display panel; and
a front window attached to the touch panel,
wherein the touch panel and the front window are bonded together with an adhesive sheet,
wherein a touch-panel flexible wiring substrate is connected to a specific side of the touch panel,
wherein a logo is formed on a surface an inner surface of the front window which inner surface faces the touch panel,
wherein the logo is formed by three layers including a first layer, a second layer, and a third layer from the side of the front window,
wherein an end portion of the second layer is covered by the third layer,
wherein a portion of the three layers of the logo is provided on a first portion of the inner surface of the front window which is outside of a second portion of the inner surface of the front window which is covered by the adhesive sheet, and
wherein a plane distance between an end portion of the second layer of the logo and an end portion of the touch panel is greater than zero so that the second layer does not overlap the touch panel in a plane view.

* * * * *